United States Patent
Park et al.

(10) Patent No.: US 10,339,315 B2
(45) Date of Patent: Jul. 2, 2019

(54) APPARATUS AND METHOD FOR DETECTING MALICIOUS MOBILE APP

(71) Applicant: Electronics and Telecommunications Research Institute, Daejeon-si (KR)

(72) Inventors: Won Joo Park, Daejeon-si (KR); Sun Joong Kim, Sejong-si (KR); Hyun Woo Lee, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 214 days.

(21) Appl. No.: 15/299,818

(22) Filed: Oct. 21, 2016

(65) Prior Publication Data
US 2017/0169224 A1 Jun. 15, 2017

(30) Foreign Application Priority Data
Dec. 10, 2015 (KR) .................. 10-2015-0175747

(51) Int. Cl.
G06F 21/56 (2013.01)

(52) U.S. Cl.
CPC ...... G06F 21/566 (2013.01); *G06F 2221/033* (2013.01)

(58) Field of Classification Search
CPC .................. G06F 21/566; G06F 2221/033
USPC .................................................. 726/23
See application file for complete search history.

(56) References Cited

U.S. PATENT DOCUMENTS

| 9,479,357 B1* | 10/2016 | Fu .................. H04W 12/12 |
| 2010/0031353 A1 | 2/2010 | Thomas et al. |
| 2011/0302654 A1* | 12/2011 | Miettinen .......... G06F 21/552 726/23 |
| 2013/0097706 A1 | 4/2013 | Titonis et al. |

FOREIGN PATENT DOCUMENTS

| KR | 10-1143999 B1 | 5/2012 |
| KR | 10-2013-0078278 A | 7/2013 |
| KR | 10-1472321 B1 | 12/2014 |

* cited by examiner

*Primary Examiner* — Jason K Gee
*Assistant Examiner* — Angela R Holmes
(74) *Attorney, Agent, or Firm* — NSIP Law

(57) ABSTRACT

An apparatus for detecting a malicious app. The apparatus may include a collector to collect a mobile app, a static analyzer to extract basic information from the collected mobile app, analyze the basic information of the extracted mobile app, and generate a call flow graph (CFG) of the mobile app, a dynamic analyzer to execute the collected mobile app, expand the CFG of the mobile app, generated by the static analyzer, to a dynamic action-based CFG, and determine a similarity between the expanded CFG and a flow graph that performs a malicious action, and a malicious app determiner to determine whether the collected mobile app is malicious by analyzing the basic information, the CFG, the call flow graph, and the similarity.

21 Claims, 6 Drawing Sheets

APPARATUS AND METHOD FOR DETECTING MALICIOUS MOBILE APP

CROSS-REFERENCE TO RELATED APPLICATION(S)

This application claims priority from Korean Patent Application No. 10-2015-0175747, filed on Dec. 10, 2015, in the Korean Intellectual Property Office, the entire disclosure of which is incorporated herein by reference for all purposes.

BACKGROUND

1. Field

The following description relates to technology for detecting malicious applications (hereinafter referred to as 'app'), and more specifically, to an apparatus and method for detecting a malicious action through the generation of a dynamic action graph of the app installed in a mobile terminal.

2. Description of the Related Art

As smartphones are widely used, mobile financial fraud rapidly increases. As well as phishing and pharming, attacks of SMS phishing (SMiShing) are recently increasing, which is an act of attempting to induce users to install a malicious app (Android application package (APK) file and malware) on their mobile phones, request personal information, or to induce the users to make a small payment with a mobile phone.

The SMiShing attack is one of the mobile financial fraud techniques to install a malicious app on a mobile terminal with or without a user's consent, wherein the malicious app may execute a personal information leakage, message extortion and delivery, etc. In order to prevent these SMiShing in advance, it is necessary to develop technology for analyzing and detecting a malicious action of a mobile app.

A recent detection technique based on signature of a mobile anti-virus vaccine for the detection and action of a malicious app is the one to make a signature of binary of the malicious app and register, thereby checking and detecting whether a certain app has the signature. However, it is possible to continuously create a malicious app with a tool that is comparatively easy to use, and a code executing a malicious action is shared among hackers, thereby rapidly increasing the number of malicious apps. However, with a recent signature-based detection technique, there is a limit in the analysis and detection.

Moreover, as a method of analyzing a malicious action of a mobile app, there is a static analysis method and a dynamic analysis method. Since the static analysis method is to analyze the app without running the app, it has an advantage in that it does not take much time to analyze the app and is safe. However, a recent malicious app has a code obfuscation technology being applied thereto, or when being installed, it is a normal app, but in the process of actually running the app, the malicious app downloads and executes external files (libraries, etc.) to perform malicious actions. In this case, the static analysis method has a disadvantage of having difficulties in precisely analyzing the app. Meanwhile, the dynamic analysis method is to analyze the action while running the app in an environment, such as a virtual machine, and it has an advantage of actually detecting a precise action. However, using the dynamic analysis method relatively may take much more time than using the static analysis method, and there is a disadvantage of making an experiment in an environment of various vendors and various mobile operating systems that are continuously updated.

SUMMARY

The following description relates to an apparatus and method for detecting a malicious mobile app in order to maximize advantages of each analysis method and mutually make up for disadvantages thereof by performing in parallel the static and dynamic analyses of a mobile app registered in an app store and an app that is installed in a terminal or will be installed.

In one general aspect, an apparatus for detecting a malicious app includes: a collector to collect a mobile app; a static analyzer to extract basic information from the collected mobile app, analyze the basic information of the extracted mobile app, and generate a call flow graph (CFG) of the mobile app; a dynamic analyzer to execute the collected mobile app, expand the CFG of the mobile app, generated by the static analyzer, to a dynamic action-based CFG, and determine a similarity between the expanded CFG and a flow graph that performs a malicious action; and a malicious app determiner to determine whether the collected mobile app is malicious by analyzing the basic information, the CFG, the call flow graph, and the similarity.

In another general aspect, a method of detecting a malicious app includes: collecting a mobile app; extracting basic information from the collected mobile app, analyzing the basic information of the extracted mobile app, and generating a call flow graph (CFG) of the mobile app; executing the collected mobile app, expanding the CFG of the mobile app to a dynamic action-based CFG, and determining a similarity between the expanded CFG and a flow graph that performs a malicious action; and determining whether the collected mobile app is malicious by analyzing the basic information, the CFG, the call flow graph, and the similarity.

Other features and aspects may be apparent from the following detailed description, the drawings, and the claims.

Figure 1:
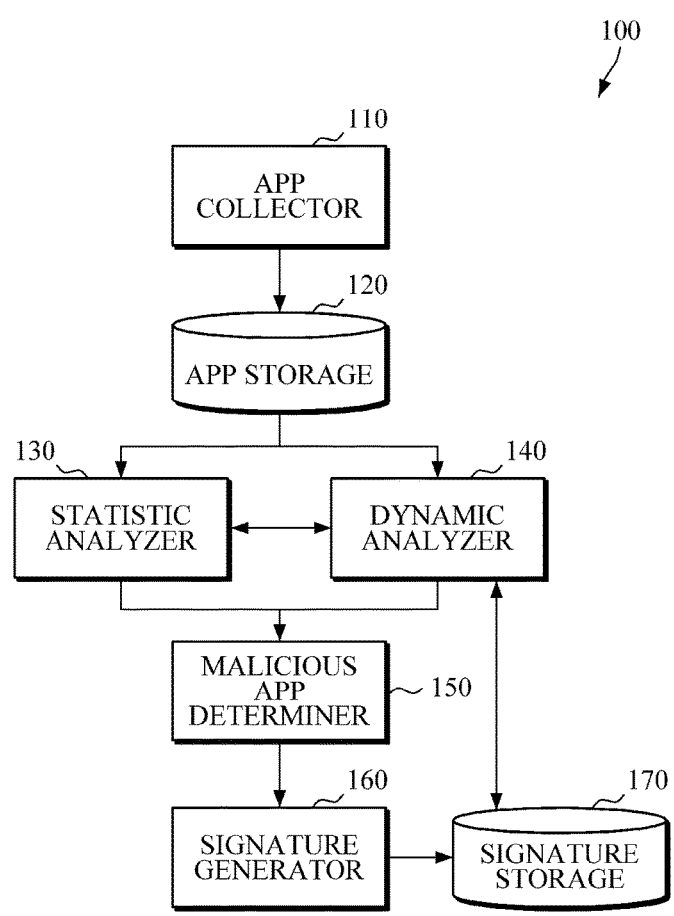
FIG. 1 is a block diagram illustrating an apparatus for detecting a malicious mobile app according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

In the following description, a detailed description of known functions and configurations incorporated herein will be omitted when it may obscure the subject matter with unnecessary detail.

Terms used throughout this specification are defined. These terms are defined in consideration of functions according to exemplary embodiments, and can be varied according to a purpose of a user or manager, or precedent and so on. Therefore, definitions of the terms should be made on the basis of the overall context.

FIG. 1 is a block diagram illustrating an apparatus for detecting a malicious mobile app according to an exemplary embodiment.

Referring to FIG. 1, an apparatus 100 for detecting a malicious mobile app performs static and dynamic analyses at the same time to discern whether the new mobile app includes a malicious action, and exchanges information mutually when performing the statistic and dynamic analyses. Accordingly, the apparatus 100 may mutually maximize strength of the static and dynamic analyses, as well as making up for the weakness between each other. In performing both of the analysis methods at the same time, there is a concern that a consumption time required for the analysis may be relatively long, but it is not the concern at all due to the technology development in processors of a recent server and a rapid growth in cloud technology.

To this end, the apparatus 100 specifically includes an app collector 110, an app storage 120, a static analyzer 130, a dynamic analyzer 140, and a malicious app determiner 150. Additionally, the apparatus 100 further includes a signature generator 160 and a signature storage 170.

The app collector 110 directly extracts a mobile app from a mobile terminal, or collects the mobile app from an app store, and then stores the mobile app in the app storage 120.

The static analyzer 130 statically extracts basic information from a mobile app stored in the app storage 120, and generates a call flow graph (CFG) using the extracted basic information. As such, the statically extracted basic information is transmitted to the dynamic analyzer 140 and then used. The detailed configuration of the static analyzer 130 will be specifically described later with reference to FIG. 2.

The dynamic analyzer 140 runs a mobile app, stored in the app storage 120, in a virtual environment or in a real environment to analyze a real action, makes a signature of a flow graph for performing a malicious action, and searches for whether a graph similar to the flow graph for performing a malicious action exists in the signature storage 170. The detailed configuration of the dynamic analyzer 140 will be specifically described later with reference to FIG. 3.

The malicious app determiner 150 finally determines whether a mobile app is the malicious one based on the combination of mobile app extraction information generated by the static analyzer 130, call flow graph (CFG) information, dynamic action graph information generated by the dynamic analyzer 140, similarity information, etc. Based on the final determination result, the analysis result of the mobile app determined as a malicious app is transmitted to the image signature generator 160.

The image signature generator 160 receives the analysis result from the malicious app determiner 150 and generates a malicious action-based partial graph signature image and entire graph signature image which are acquired through a dynamic action analysis.

The image signature storage 170 stores the malicious action-based partial graph signature and entire graph signature generated by the image signature generator 160, but which are separately stored. Also, the image signature storage 170 may store the signatures in connection with the related mobile app extraction information as well as the image signature. As such, the stored image signature may be used in analyzing a new app later and may be continuously accumulated.

Figure 2:
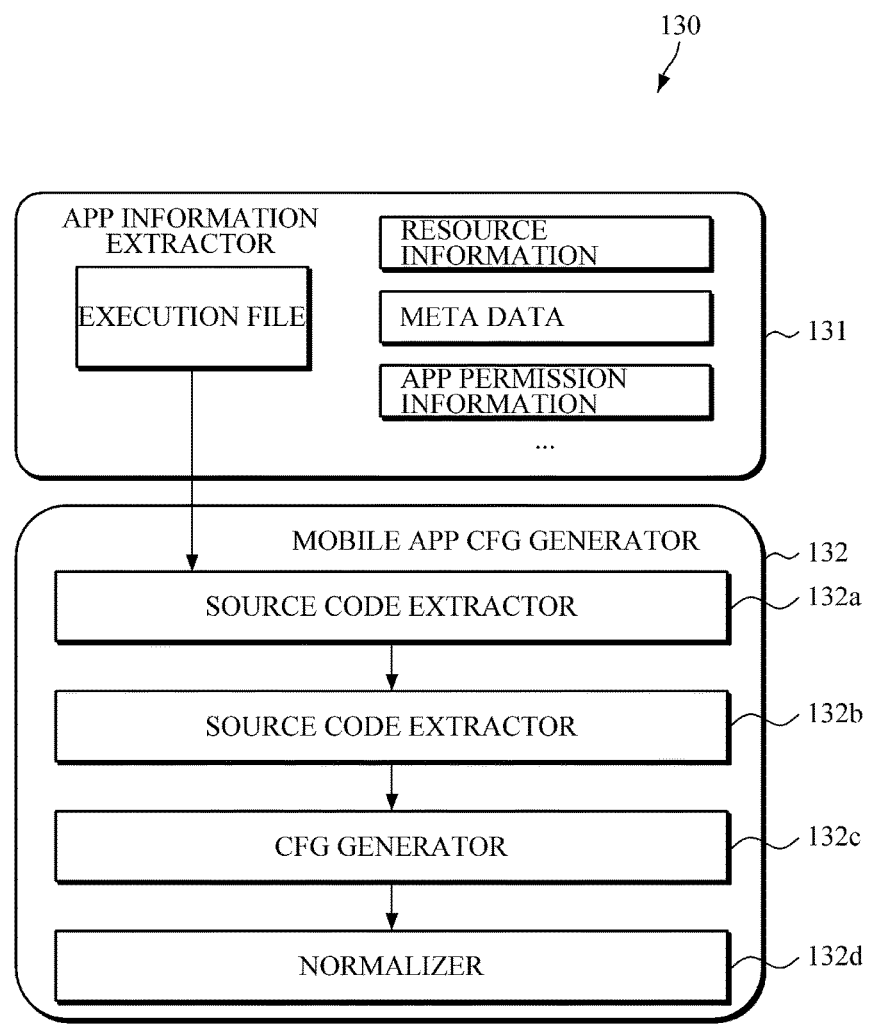
FIG. 2 is a detailed block diagram illustrating a static analyzer according to an exemplary embodiment.

FIG. 2 is a detailed block diagram illustrating a static analyzer according to an exemplary embodiment.

Referring to FIG. 2, a static analyzer 130 includes an app information extractor 131 and a mobile app call flow graph (CFG) generator 132.

The app information extractor 131 extracts basic information included in a mobile app for a static analysis. If the file is a type of a compressed file, the app information extractor 131 may decompress a file. Here, the basic information may include an execution file, an app's resource information, metadata information, and permission (authority to access resource) information used and defined in the app, which are acquire from the decompressed mobile app. However, this is just one example, but the basic information is not limited thereto. That is, the above-mentioned basic information may not be included depending on a mobile app type, or other information may be further included.

The mobile app CFG generator 132 generates a call flow graph by using the execution file among the basic information above, and more specifically, includes a source code extractor 132a, a method searcher 132b, a call flow graph (CFG) generator 132c, and a normalizer 132d.

The source code extractor 132a generates a binary hash value of the execution file, decompiles or disassembles the execution file, and then extracts a source code or assembled code.

The method searcher 132b searches for a method in the source code or assembled code that is extracted by the source code extractor 132a, and then extracts the corresponding code thereto.

The CFG generator 132c analyzes a function call based on the source code extracted by the source code extractor 132a and the method searcher 132b, and then generates a call flow graph (CGF). That is, a mobile app may make use of the characteristics of completing determined tasks by performing a series of commands to execute programs. A tracking of such a series of processes may make important information that represents well the characteristics of the app, and the use of such information may lead to generating a call flow graph (CFG) that connects a method (function), a loop, a conditional branch, etc., which are represented while the program is running. Generally, the CFG may be generated through the extraction of all executable paths from a start node up to an end node, or a signature of the CFG may be made through the extraction of only the part of a graph for performing a predetermined malicious action.

The normalizer 132d performs normalization and abstraction operations by removing identifiers, etc., from the extracted CFG.

Figure 3:
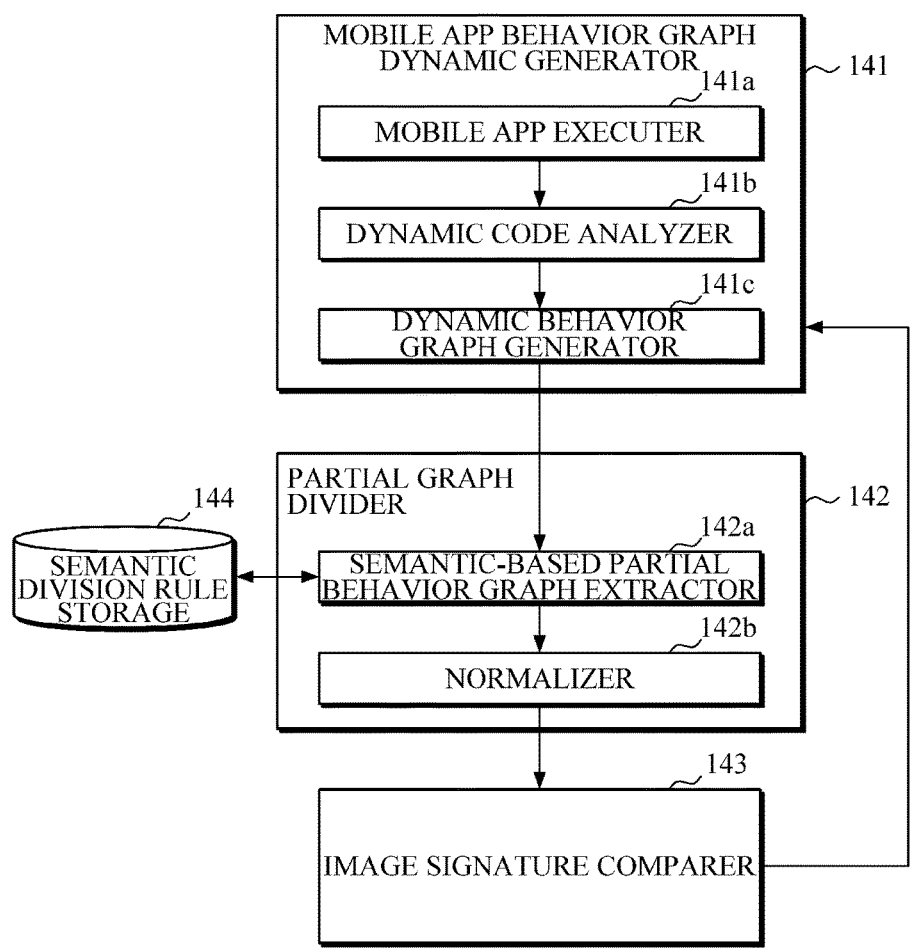
FIG. 3 is a detailed block diagram illustrating a dynamic analyzer according to an exemplary embodiment.

FIG. 3 is a detailed block diagram illustrating a dynamic analyzer according to an exemplary embodiment.

Referring to FIG. 3, a dynamic analyzer 140 includes a mobile app action graph dynamic generator 141, a partial graph divider 142, an image signature comparer 143, and a semantic division rule storage 144.

The mobile app action graph dynamic generator 141 executes a mobile app, transmitted from an app storage 120, in a virtual environment or a real mobile terminal environment, and dynamically expands a call flow graph (CFG) of the mobile app to an action-based CFG by analyzing the real call process of the CFG through the mutual exchange of the information with a static analyzer 130.

Specifically, the mobile app action graph dynamic generator 141 includes a mobile app executer 141*a*, a dynamic code analyzer 141*b*, and a dynamic action graph generator 141*c*.

The mobile app executer 141*a* receives basic information of the transmitted app from the static analyzer 130 and runs a virtual environment suitable for an execution environment. The dynamic code analyzer 141*b* dynamically analyzes a code when a mobile app is executed. Here, call information not acquired by the static analyzer 130, such as a library call, a call of a compressed executable code, etc., may be analyzed.

The dynamic action graph generator 141*c* generates a dynamic action graph according to the analysis result, and specifically, generates the dynamic action graph by expanding the CFG received form the statistic analyzer 130. Here, the dynamic action graph is the CFG that is connected through the observation of a process of dynamically executing the app, and is the CFG that is generalized excluding ineffective identifier information, etc., due to code obfuscation, and the like. Also, the dynamic action graph is primarily similar to the CFG that is generated by the static analyzer 130, but a real action-based call flow analysis may be additionally performed in the actual execution process. Here, in the process of dynamically generating the action graph, a library call, a wrapping function call, a compressed executable code call, a call connected to data (e.g., indent), and the like are represented in the action graph, so graph information not able to be generated in the static analyzer 130 is generated. This graph information may be transmitted again to the static analyzer 130, then additionally stored in mobile app extraction information, and used in the CFG.

The partial graph divider 142 extracts a semantic-based partial action-based graph from an entire action graph with reference to a pre-stored semantic division rule storage 144, and more specifically, includes a semantic-based partial action graph extractor 142*a* and a normalizer 142*b*.

With reference to the pre-stored semantic division rule storage 144, the semantic-based partial action graph extractor 142*a* extracts the partial action graph of a module unit from the dynamic action-based CFG that is generated in advance in the above-mentioned operation. Here, the generated CFG based on the dynamic action is divided in an interjection or union unit within a semantically separable range. In other words, the semantic partial action graph of the module unit is extracted to be then used in a similarity comparison, in order to detect a malicious app to which a repackaging technique, etc., is applied. Here, the semantic-based partial action graph extractor 142*a* may be repeatedly performed so that all semantically usable partial graphs may be extracted. In addition, after the generation of the partial action graph, it is possible to divide again the partial action graph depending on the need. The semantic partial graph of the module unit may be divided by a module transmitted to a message, etc., but if it is possible for the partial graph to be contextually distinguished, the partial graph is all applied, and the present disclosure does not set any limit relating thereto.

The normalizer 142*b* removes identifiers from the extracted entire action graph and partial action graph.

The image signature comparer 143 searches for a partial graph, dynamically generated, in a signature storage 170 and then compares similarities. That is, the image signature comparer 143 compares the similarity between the partial graph and the partial graph signature image that is generated based on an existing malicious action. An algorithm of comparing the graph image similarities may be generally a graph's isomorphism, edit distance, maximum common subgraph, statistical similarity measure, etc.

The static analyzer 130 and the dynamic analyzer 140 perform information in parallel while exchanging such information between each other as described above, and the information transmitted from the static analyzer 130 to the dynamic analyzer 140 may include a mobile app's basic information (name, signature, size, etc.), static CFG, use-declared permission, resource information, etc. On the other hand, the information transmitted from the dynamic analyzer 140 to the static analyzer 130 may include additionally called method information, an expanded action graph, an expanded permission, expanded resource information, and downloaded element information.

Figure 4:
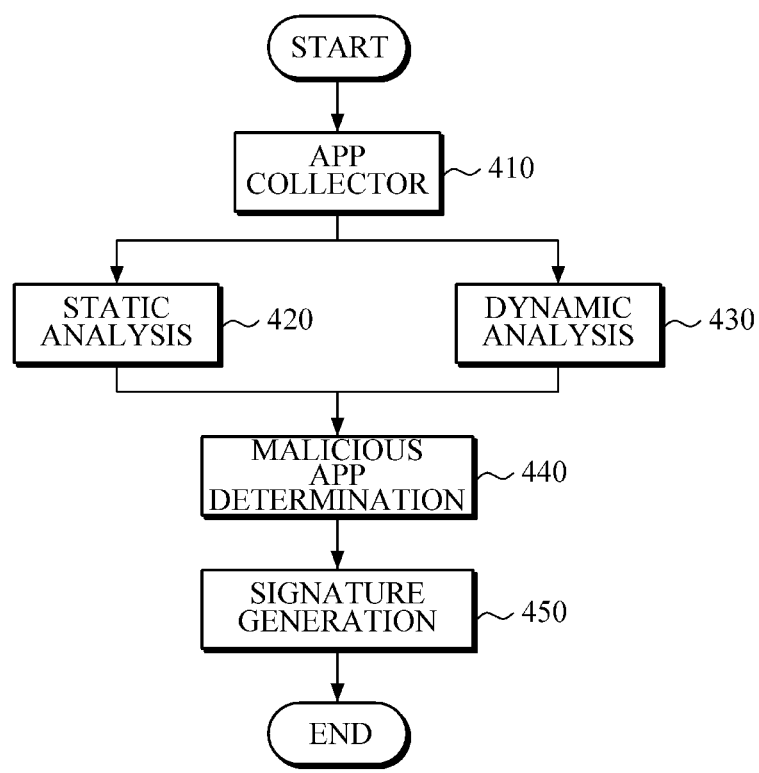
FIG. 4 is a flowchart illustrating a method of detecting a malicious mobile app according to an exemplary embodiment.

FIG. 4 is a flowchart illustrating a method of detecting a malicious mobile app according to an exemplary embodiment.

Referring to FIG. 4, an apparatus 100 for detecting a malicious mobile app extracts a mobile app directly from a mobile terminal, or collects the mobile app from an app store, and then stores it in an app storage 120 in 410.

The apparatus 100 statically extracts basic information from a mobile app stored in the app storage 120, and generates a call flow graph (CFG) using the extracted basic information in 420. As such, the statically extracted basic information is used in a dynamic analysis. The detailed configuration of such a static analysis operation will be specifically described later with reference to FIG. 5.

The apparatus 100 runs a mobile app, stored in the app storage 120, in a virtual environment or in a real environment to analyze a real action, makes a signature of a flow graph for performing a malicious action, and searches for whether a graph similar to the flow graph for performing a malicious action exists in the signature storage 170 in 430. The detailed configuration of such a dynamic analysis will be specifically described later with reference to FIG. 6.

The apparatus 100 finally determines whether a mobile app is the malicious one, in 440, based on the combination of mobile app extraction information generated in the static analysis operation, call flow graph (CFG) information, dynamic action graph information generated in the dynamic analysis operation, similarity information, etc.

The apparatus 100 receives an analysis result of determining whether a mobile app is the malicious one, and in 450, generates a malicious action-based partial graph signature image and entire graph signature image which are acquired through a dynamic action analysis. The generated partial graph signature image and entire graph signature image, which are based on the malicious action, are separately stored.

Figure 5:
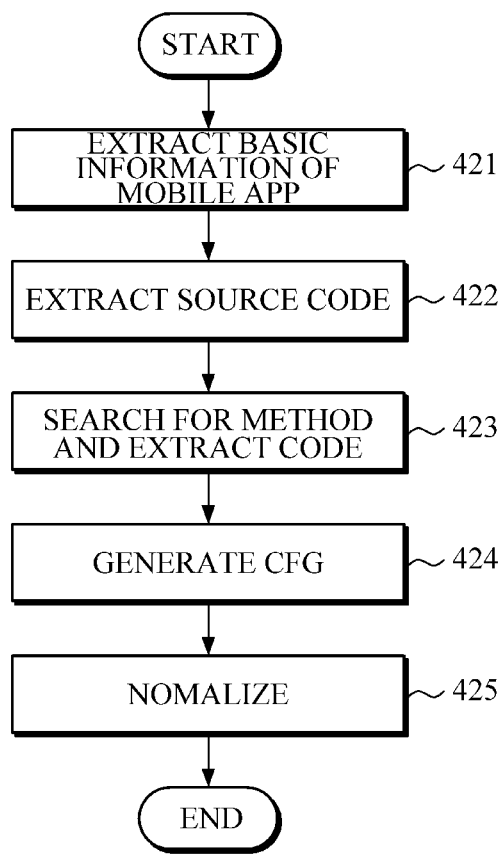
FIG. 5 is a flowchart for the description of a static analysis operation according to an exemplary embodiment.

FIG. 5 is a flowchart for the description of a static analysis operation according to an exemplary embodiment.

Referring to FIG. 5, an apparatus 100 for detecting a malicious mobile app extracts basic information included in a mobile app for a static analysis in 421. Here, in a case of a type of a compressed file, a decompression operation may be further included. For example, the basic information may include an execution file, an app's resource information, metadata information, and permission (authority to access resource) information used and defined in the app, which are acquired from the decompressed mobile app. However, this is just one example, but the basic information is not limited thereto. That is, the above-mentioned basic information may not be included depending on a mobile app type, or other information may be further included.

The apparatus 100 generates a binary hash value of the execution file, decompiles or disassembles the execution file, and then extracts a source code or assembled code in 422. Then, the apparatus 100 searches for a method in the extracted source code or assembled code and then extracts the corresponding code thereto in 423.

The apparatus 100 analyzes a function call based on the extracted source code, and then generates a call flow graph (CGF) in 424. That is, a mobile app may make use of the characteristics of completing determined tasks by performing a series of commands to execute programs. A tracking of such a series of processes may make important information that represents well the characteristics of the app, and the use of such information may lead to generating a call flow graph (CFG) that connects a method (function), a loop, a conditional branch, etc., which are represented while the program is running. Generally, the CFG may be generated through the extraction of all executable paths from a start node up to an end node, or a signature of the CFG may be made through the extraction of only the part of a graph for performing a predetermined malicious action.

Additionally, the apparatus 100 performs normalization and abstraction operations by removing identifiers, etc., from the generated CFG in 425.

Figure 6:
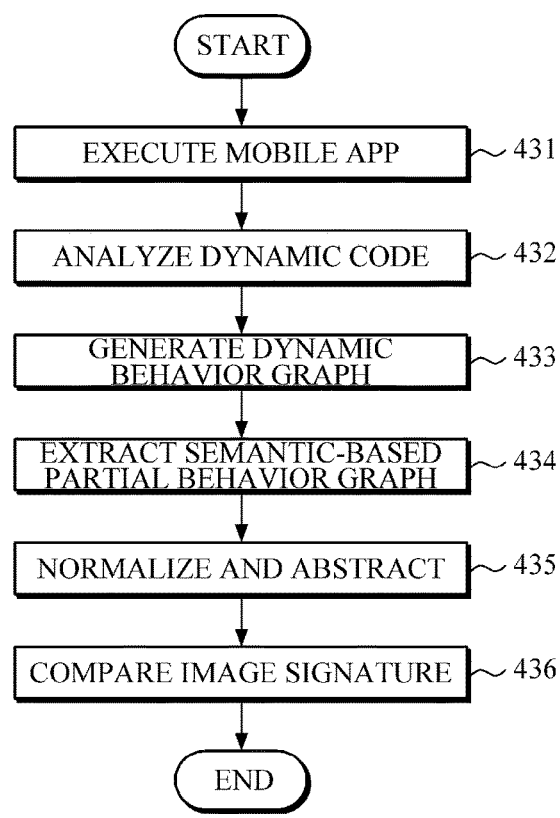
FIG. 6 is a flowchart for the description of a dynamic analysis operation according to an exemplary embodiment.

FIG. 6 is a flowchart for the description of a dynamic analysis operation according to an exemplary embodiment.

Referring to FIG. 6, an apparatus 100 for detecting a malicious mobile app runs a virtual environment suitable for an execution environment by using an app's basic information according to a static analysis in 431. In operation 432, the apparatus 100 dynamically analyzes a code when a mobile app is executed. Here, call information not acquired through the static analysis, such as a library call, a call of a compressed executable code, etc., may be analyzed.

The apparatus 100 generates a dynamic action graph according to the analysis result, and specifically, generates the dynamic action graph by expanding the CFG that is generated through the static analysis in 433. Here, the dynamic action graph is the CFG that is connected through the observation of a process of dynamically executing the app, and is the CFG that is generalized excluding ineffective identifier information, etc., due to code obfuscation, and the like. Also, the dynamic action graph is primarily similar to the CFG that is generated by a static analyzer 130, but a real action-based call flow analysis may be additionally performed in the actual execution process. Here, a flow graph of data (e.g., indent) may be generated together along with the CFG. In the process of dynamically generating the action graph, a library call, a wrapping function call, a compressed executable code call, a call connected to data (e.g., indent), and the like are presented in the action graph, so graph information not able to be generated in the static analyzer is generated. This graph information may be transmitted again to the static analyzer, then additionally stored in mobile app extraction information, and used in the CFG.

In operation 434, the apparatus 100 extracts a semantic-based partial action-based graph from an entire action graph with reference to a pre-stored semantic division rule set. In order to detect a malicious app to which a repackaging technique, etc., is applied, an exemplary embodiment according to the present disclosure extracts a semantic partial action of a module unit and then use it in a similarity comparison. This aims to detect a malicious action module which has a very high possibility of being stolen from other malicious apps. The partial action graph may be repeatedly performed so that all semantically usable partial graphs may be extracted. In addition, after the generation of the partial action graph, it is possible to divide again the partial action graph depending on the need. The semantic partial graph of the module unit may be divided by a module transmitted to a message, etc., but if it is possible for the partial graph to be contextually distinguished, the partial graph is all applied, and the present disclosure does not set any limit relating thereto. The partial action graph may dynamically expand, and the divided partial action graph continues until the dynamic analysis is complete.

The apparatus 100 removes identifiers from the extracted entire action graph and partial action graph in 435. Then, the apparatus 100 searches for a dynamically generated partial graph in a signature storage and then compares similarities in 436. That is, the image signature comparer 143 compares the similarity between the partial graph and the partial graph signature image that is generated based on an existing malicious action. An algorithm of comparing the graph image similarities may be generally a graph's isomorphism, edit distance, maximum common subgraph, statistical similarity measure, etc.

An exemplary embodiment of the present disclosure has an effect of reducing a user's damage, etc., which is caused by personal information leakage, financial fraud, and the like.

Also, in a dynamic analysis method, the exemplary embodiment according to the present disclosure may perform a static analysis method together at the same time, mutually exchange information, generate a dynamic action graph based on information that is extracted through the static analysis method, and store again such information in app extraction information generated by a static analyzer, thereby having an effect of extending the information related to the mobile app, so that such information may be used as basic information for a new app analysis.

Moreover, in a process of analyzing and determining whether a mobile app is the malicious one, in generating an action graph through the dynamic analysis method, as well as through the static analysis method, a CFG generated through an analysis of a source code is expanded to an action graph included as a connection process in which a real malicious code is called. This dynamic action graph is generated as an image signature and stored except for identifier information, etc., and even though a mobile app is the newly malicious one that is physically changed using an obfuscation tool, etc., its malicious action being performed in a semantic manner is similar, thereby leading to an effect of partially detecting a malicious action.

Furthermore, in a case of a malicious app using only a malicious code in a partial module unit through a repacking technique, etc., there is an effect of making it possible to detect the malicious app through an analysis of a partial action graph and a similarity comparison. That is, in a method of detecting and analyzing whether a mobile app is the malicious one, the Android operating system, which holds 70% of the worldwide market share until recently, is an open-source platform, and also may conveniently acquire the source of an app installed in a terminal, so an Android malicious app may repackage an existing malicious app by partially modifying and redistributing the app or inserting only a partial malicious code into a normal app. The present disclosure has an effect that making use of such features of a malicious app, it may be analyzed whether an mobile app is the malicious one by comparing similarities thereof with an existing malicious app and a malicious code module.

What is claimed is:

1. An apparatus for detecting a malicious application, the apparatus comprising:
 a processor configured to
  collect a mobile application,
  extract basic information from the collected mobile application,
  generate a call flow graph (CFG) of the mobile application,
  execute the collected mobile application, and expand the CFG of the mobile application to a dynamic action-based CFG,
  extract a semantic-based partial action-based graph from the dynamic action-based CFG with reference to a semantic division rule set,
  compare the extracted semantic-based partial action-based graph and a partial graph signature image of a reference malicious action, and
  determine whether the collected mobile application is malicious based on the comparison and by analyzing the extracted basic information,
  wherein the basic information comprises any one or any combination of any two or more of an execution file, resource information, metadata information, and permission information of the mobile application.

2. The apparatus of claim 1, wherein the extraction of the basic information and the execution of the collected mobile application are performed in parallel.

3. The apparatus of claim 1, wherein the processor is further configured to
 generate a malicious action-based partial graph signature image and an entire graph signature image from a mobile application that is determined to be malicious, and
 separately store the action-based partial graph signature image and the entire graph signature image, which are based on a malicious action.

4. The apparatus of claim 1, wherein the CFG of the mobile application is generated by using the execution file.

5. The apparatus of claim 4, wherein the processor is further configured to
 decompile or disassemble the execution file,
 extract a source code or an assembled code,
 search for a method in the source code or the assembled code,
 extract the source code that corresponds to the method, and
 analyze a function call based on the source code.

6. The apparatus of claim 5, wherein the processor is further configured to perform normalization and abstraction operations by removing identifiers from the generated CFG of the mobile application.

7. The apparatus of claim 1, wherein the processor is further configured to
 execute the collected mobile application in a virtual environment or a real mobile terminal environment, and dynamically expand the CFG of the mobile application by analyzing a real call process of the CFG of the mobile application through a mutual exchange of information.

8. The apparatus of claim 7, wherein the processor is further configured to
 receive the basic information,
 run a virtual environment suitable for an execution environment,
 in response to the execution of the mobile application, dynamically analyze a code, and
 based on an analysis result, generate a dynamic action-based CFG by expanding the CFG of the mobile application.

9. The apparatus of claim 8, wherein the dynamic action-based CFG includes a flow of a designated data type and the CFG.

10. The apparatus of claim 8, wherein the processor is further configured to
 remove identifiers from the extracted semantic-based partial action-based graph.

11. The apparatus of claim 8, wherein the semantic-based partial action-based graph is divided in an interjection or union unit within a semantically separable range.

12. A method of detecting a malicious application, the method comprising:
 collecting a mobile application;
 extracting basic information from the collected mobile application;
 generating a call flow graph (CFG) of the mobile application;
 executing the collected mobile application;
 expanding the CFG of the mobile application to a dynamic action-based CFG;
 extracting a semantic-based partial action-based graph from the dynamic action-based CFG with reference to a semantic division rule set;
 comparing the extracted semantic-based partial action-based graph and a partial graph signature image of a reference malicious action; and
 determining whether the collected mobile application is malicious by based on the comparison and by analyzing the basic information,
 wherein the basic information comprises any one or any combination of any two or more of an execution file, resource information, metadata information, and permission information of the mobile application.

13. The method of claim 12, wherein the generating of the CFG of the mobile application and the comparing are performed in parallel.

14. The method of claim 12, further comprising:
 generating a malicious action-based partial graph signature image and an entire graph signature image from a mobile application that is determined to be malicious; and
 separately storing the generated partial graph signature image and the entire graph signature image, which are based on a malicious action.

15. The method of claim 12, wherein the generating of the CFG of the mobile application comprises
 decompiling or disassembling the execution file,
 extracting a source code or an assembled code,
 searching for a method in the extracted source code or the assembled code,
 extracting the source code that corresponds to the method, and
 analyzing a function call based on the extracted source code.

16. The method of claim 12, wherein the generating of the CFG of the mobile application comprises
 performing normalization and abstraction operations by removing identifiers from the generated CFG of the mobile application.

17. The method of claim 12, wherein the comparing of the extracted semantic-based partial action-based graph and the partial graph signature image of the reference malicious action comprises
- receiving the basic information,
- running a virtual environment suitable for an execution environment,
- in response to the execution of the mobile application, dynamically analyzing a code, and
- based on a result of the analyzing, generating a dynamic action-based CFG by expanding the CFG of the mobile application.

18. The method of claim 14, further comprising determining whether another application is malicious using the stored partial graph signature image and the stored entire graph signature image.

19. The method of claim 12, wherein the dynamic action-based CFG represents a library call, a wrapping function call, a compressed executable code call, and a call connected to data.

20. The apparatus of claim 1, wherein the comparison is based on any one or any combination of any two or more of an isomorphism, an edit distance, and a maximum common subgraph.

21. The apparatus of claim 3, wherein the malicious action-based partial graph signature image is generated through an extraction of part of a graph for performing a malicious action.

* * * * *